(12) United States Patent
Wedlake et al.

(10) Patent No.: US 7,905,325 B1
(45) Date of Patent: Mar. 15, 2011

(54) RELATING TO LUBRICATION SYSTEM FOR AIRCRAFT ENGINES

(75) Inventors: Norman J Wedlake, Bristol (GB); Christopher Wright, Bristol (GB); Robin M Coleman, Bristol (GB); John A Rumbelow, Malborough (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 07/605,168

(22) Filed: Oct. 12, 1990

(30) Foreign Application Priority Data

Nov. 3, 1989 (GB) ................... 8924909.8

(51) Int. Cl.
*F01D 25/18* (2006.01)
*F16N 7/30* (2006.01)

(52) U.S. Cl. ...................... 184/6.11; 184/55.1

(58) Field of Classification Search ................ 184/6.11, 184/6.28, 31; 60/39.08; 123/196 CP
See application file for complete search history.

(56) References Cited

U.S. PATENT DOCUMENTS 4,157,744 A * 6/1979 Capriotti ...................... 184/6.11
4,648,485 A * 3/1987 Kovaleski ........................ 184/31

FOREIGN PATENT DOCUMENTS

| GB | 1398456 | 6/1975 |
| GB | 1497624 | 1/1978 |
| GB | 2042649 | 9/1980 |
| GB | 2084266 | 4/1982 |
| GB | 2204642 | 11/1988 |

* cited by examiner

*Primary Examiner* — Timothy D Collins
*Assistant Examiner* — Joseph W Sanderson
(74) *Attorney, Agent, or Firm* — Oliff & Berridge, PLC

(57) ABSTRACT

A pumped oil delivery system for delivering oil to moving parts of an aircraft jet engine includes a scoop delivery pump and an accumulator oil reservoir to maintain oil feed to the pump at all times. The system includes a first line to feed oil from the scoop pump to the oil reservoir, a second line to return oil from the oil reservoir to the scoop pump, and pressurized air for pressurizing the oil within the oil reservoir so as to maintain a continuous feed of oil to the pump. The system includes further lines for delivering oil from the scoop pump to the moving parts and for returning oil from the moving parts to the scoop pump. Moving parts include a self scavenging gear box utilizing the centrifugal pumping action of its gears to return oil to the scoop pump, and self scavenging bearing chambers using centrifugal effects of their rotating parts also to return oil to the scoop pump.

5 Claims, 1 Drawing Sheet

RELATING TO LUBRICATION SYSTEM FOR AIRCRAFT ENGINES

Figure 1:
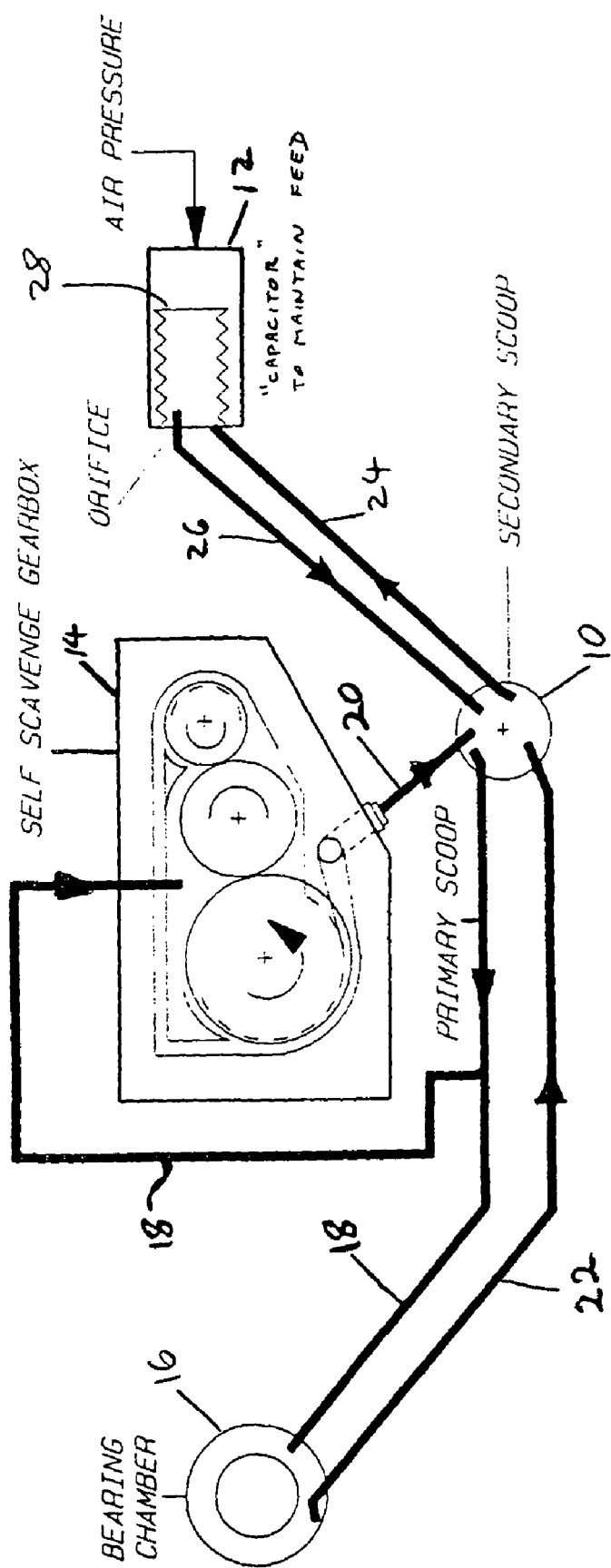

This invention concerns improvements in or relating to lubrication systems, in particular lubrication systems for aircraft engines.

Lubricating the moving parts of aircraft engines, particularly engines used in jet fighter aircraft, presents special problems. Fighter aircraft in combat situations frequently operate at or near the limits of their performance and may, under conditions of high "g" forces and/or high altitude, experience temporary loss of fuel pressure or lubrication in certain parts of the engine or its associated gear boxes, with a consequent overheating of engine or gear box parts and a possible reduction in performance. Particular adverse effects which may be experienced under combat conditions include loss of pressure in the oil pump, and oil hiding, that is, a quantity of oil is unused because it remains "hidden" and is not circulated through the moving parts.

It is an object of the present invention to provide for an aircraft jet engine a pumped oil system which is insensitive to aircraft attitude or altitude and in which loss of pressure in the pump is eliminated.

According to the present invention there is provided, for an aircraft jet engine, a pumped oil delivery system for delivering oil to moving parts, the system including in cooperative relationship a scoop delivery pump and an accumulator oil reservoir to maintain oil feed to the pump at all times.

Preferably, the oil delivery system includes a first line to feed oil from the scoop pump to the oil reservoir, a second line to return oil from the oil reservoir to the scoop pump, and means for pressurising the oil within the oil reservoir so as to maintain a continuous feed of oil to the pump.

Preferably, the means for pressurising the oil within the oil reservoir is air pressure.

Preferably, the oil delivery system includes a further oil line for delivering oil from the scoop pump to each said moving part and a return oil line for returning oil from said moving part to the scoop pump.

A said moving part may be a self scavenging gear box utilising the centrifugal pumping action of the gears to return oil to the scoop pump.

A said moving part may be a self scavenging bearing chamber using centrifugal effects of its rotating parts to return oil to the scoop pump.

The invention will now be described by way of example only with reference to the accompanying FIG. 1 which is a block diagram representation of a lubrication system for a jet aircraft engine.

Referring to FIG. 1 there is shown a scoop delivery pump 10, an accumulator oil reservoir 12, a self scavenging gear box 14, and a self scavenging bearing chamber 16.

A primary scoop line 18 takes oil from the pump 10 and delivers the oil to the gear box 14 and the bearing chamber 16 (of which there may be more than one). First and second return lines 20, 22 return oil from the gear box 14 and the bearing chamber 16 respectively to the pump 10.

A secondary scoop line 24 takes oil from the pump 10 and delivers it to the accumulator reservoir 12 from whence a third return line 26 returns oil to the pump.

The accumulator reservoir 12 is provided by a piston 28 sliding in the bore of a cylinder. The space between the piston crown and the end of the cylinder is filled with oil fed into the cylinder from the secondary scoop line 24. The oil in the cylinder space is pressurised by compressed air acting against the base of the piston. Consequently, oil fed into the reservoir 12 from the pump 10 is returned to the pump under positive pressure and loss of pressure in the pump from whatever cause (altitude, attitude, or "g" forces) is eliminated. The air pressure may be controlled by suitable valve means, or by air bled from a compressor stage, to ensure that the air pressure acting on the piston is not so great that the pump is unable to pump oil into the reservoir.

The gear box 14 is a self scavenging gear box whereby all the oil used is scavenged by the centrifugal action of the gear train within and returned to the scoop pump 10 via line 20. Likewise, the bearing chamber 16 is a self scavenging chamber in which the centrifugal action of the bearings returns oil to the pump 10 via line 22.

It is convenient to have the reservoir 12 incorporated as an integral part of the gear box 14, thereby saving bulk and weight.

The invention provides an oil management system for a jet aircraft engine in which oil is pumped at all times to and from all chambers; problems associated with two phase flow are greatly reduced and possibly eliminated; the bulk size of the oil system is reduced, hence achieving reductions in weight and cost; oil contents is reduced to the capacity of usable oil since oil hiding is eliminated (a consequence of the positive pumping to and from all chambers); and loss of pressure pump prime is eliminated as the system is insensitive to attitude and altitude.

We claim:

1. For an aircraft jet engine, a pumped oil delivery system for delivering oil to moving parts, the system including in cooperative relationship a scoop delivery pump and an accummulator oil reservoir to maintain oil feed to the pump at all times, the system characterised in including a first oil line to feed oil from the scoop pump to the oil reservoir, a second oil line to return oil from the oil reservoir to the scoop pump and means for pressurising the oil within the oil reservoir so as to maintain a continuous feed of oil to the pump.

2. An oil delivery system as claimed in claim 1 wherein the means for pressurising the oil within the oil reservoir is air pressure.

3. An oil delivery system as claimed in claim 1 wherein the system includes a further oil line for delivering oil from the scoop pump to each moving part and a return oil line for returning oil from said each moving part to the scoop pump.

4. An oil delivery system as claimed in claim 3 wherein a said moving part is a self scavenging gear box utilising the centrifugal pumping action of its gears to return oil to the scoop pump via the return oil line.

5. An oil delivery system as claimed in claim 3 wherein a said moving part is a self scavenging bearing chamber using centrifugal effects of its rotating parts to return oil to the scoop pump via the return oil line.

* * * * *